US009282462B2

(12) United States Patent
Dayal et al.

(10) Patent No.: US 9,282,462 B2
(45) Date of Patent: Mar. 8, 2016

(54) METHOD AND APPARATUS TO FACILITATE SUPPORT FOR MULTI-RADIO COEXISTENCE

(75) Inventors: Pranav Dayal, San Diego, CA (US); Tamer A. Kadous, San Diego, CA (US); Ashok Mantravadi, San Diego, CA (US); Jibing Wang, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 13/004,006

(22) Filed: Jan. 10, 2011

(65) Prior Publication Data

US 2012/0020229 A1   Jan. 26, 2012

Related U.S. Application Data

(63) Continuation-in-part of application No. 12/904,509, filed on Oct. 14, 2010.

(60) Provisional application No. 61/319,324, filed on Mar. 31, 2010, provisional application No. 61/356,973, filed on Jun. 21, 2010, provisional application No. 61/389,637, filed on Oct. 4, 2010.

(51) Int. Cl.
*H04B 7/00* (2006.01)
*H04W 16/14* (2009.01)
*H04W 88/06* (2009.01)

(52) U.S. Cl.
CPC .............. *H04W 16/14* (2013.01); *H04W 88/06* (2013.01)

(58) Field of Classification Search
CPC ............................ H04W 16/14; H04W 88/06
USPC ........................................................ 455/41.2
See application file for complete search history.

(56) References Cited

U.S. PATENT DOCUMENTS

| 7,725,118 | B2 * | 5/2010 | Yang et al. ................... 455/502 |
| 8,259,600 | B1 | 9/2012 | Dinan et al. |
| 8,340,580 | B1 | 12/2012 | Epstein |
| 2007/0206631 | A1 | 9/2007 | Parts et al. |
| 2007/0223430 | A1 | 9/2007 | Desai et al. |
| 2008/0144500 | A1 | 6/2008 | Chen et al. |
| 2008/0227401 | A1 | 9/2008 | Scherzer et al. |
| 2008/0233875 | A1 | 9/2008 | Desai et al. |

(Continued)

FOREIGN PATENT DOCUMENTS

| CN | 101208886 A | 6/2008 |
| CN | 101272540 A | 9/2008 |

(Continued)

OTHER PUBLICATIONS

International Search Report and Written Opinion—PCT/US2011/030569, ISA/EPO—Jul. 20, 2011.

(Continued)

*Primary Examiner* — David Bilodeau
(74) *Attorney, Agent, or Firm* — Jimmy Cheng

(57) ABSTRACT

A method of wireless communication includes receiving signaling from a served User Equipment (UE), via a radio access technology, indicating an interfering technology associated with coexistence issues experienced by the served UE. The method also includes calculating future subframes expected to experience coexistence issues based on previous subframes estimated to have experienced coexistence issues.

16 Claims, 10 Drawing Sheets

(56) References Cited

U.S. PATENT DOCUMENTS

| | | |
|---|---|---|
| 2009/0067448 A1* | 3/2009 | Stanwood et al. ............ 370/447 |
| 2009/0081962 A1 | 3/2009 | Sohrabi |
| 2009/0213804 A1* | 8/2009 | Yoon et al. .................... 370/329 |
| 2010/0197235 A1 | 8/2010 | Wilhelmsson |
| 2011/0134891 A1 | 6/2011 | Yang et al. |
| 2011/0256834 A1 | 10/2011 | Dayal et al. |
| 2012/0071103 A1* | 3/2012 | Kadous et al. ............... 455/63.1 |
| 2012/0093009 A1* | 4/2012 | Wang et al. ................... 370/252 |
| 2012/0188907 A1* | 7/2012 | Dayal et al. ................... 370/254 |

FOREIGN PATENT DOCUMENTS

| | | |
|---|---|---|
| CN | 101646159 A | 2/2010 |
| EM | 1589781 | 10/2005 |
| JP | 2010505329 A | 2/2010 |
| KR | 100740170 B1 | 7/2007 |
| KR | 20090111599 A | 10/2009 |
| WO | WO-2008050958 A1 | 5/2008 |
| WO | WO-2009137295 A2 | 11/2009 |

OTHER PUBLICATIONS

Lee Chi-Chen et al., "Sub-frame based Multi-Radio Coexistence Control Mechanism for IEEE 802.16m", C802.16m-08/1028r1, IEEE, Sep. 9, 2008, URL: http://grouper.ieee.org/groups/802/16/tgm/contrib/C80216m-08_1028r1.pdf.

* cited by examiner

METHOD AND APPARATUS TO FACILITATE SUPPORT FOR MULTI-RADIO COEXISTENCE

CROSS-REFERENCE TO RELATED APPLICATIONS

This application is a continuation-in-part of U.S. patent application Ser. No. 12/904,509 filed Oct. 14, 2010, in the names of P. DAYAL et al, which claims the benefit of U.S. Provisional Patent Application No. 61/319,324, filed Mar. 31, 2010, entitled "METHOD AND APPARATUS FOR MITIGATING COEXISTENCE PROBLEMS VIA UE INTERACTION WITH ENB," U.S. Provisional Patent Application No. 61/319,324 filed Jun. 21, 2010, entitled "METHOD AND APPARATUS TO FACILITATE SUPPORT FOR MULTI-RADIO COEXISTENCE," and U.S. Provisional Patent Application No. 61/389,637 filed Oct. 4, 2010, entitled "METHOD AND APPARATUS TO FACILITATE SUPPORT FOR MULTI-RADIO COEXISTENCE, the disclosures of which are expressly incorporated by reference herein in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a position location e.g., Global Positioning System (GPS)) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, and/or resource collision, other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with position location. Currently, there is no mechanism that can solve this issue because LTE by itself does not experience any degradation.

With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to inform handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency of other radios of the UE.

SUMMARY

A method of wireless communication includes receiving signaling from a served User Equipment (UE), via a radio access technology, indicating an interfering technology associated with coexistence issues experienced by the served UE. The method also includes calculating future subframes expected to experience coexistence issues based on previous subframes estimated to have experienced coexistence issues.

In another aspect, a system is operable in a wireless communication system. The system includes means for receiving signaling from a served User Equipment (UE), via a radio access technology, indicating an interfering technology associated with coexistence issues experienced by the served UE. The system also includes means for calculating future subframes expected to experience coexistence issues based on previous subframes estimated to have experienced coexistence issues.

In yet another aspect, an apparatus for wireless communication, includes a memory; and at least one processor coupled to the memory. The at least one processor is configured to receive signaling from a served User Equipment (UE), via a radio access technology, indicating an interfering technology associated with coexistence issues experienced by the served UE. The processor(s) is also configured to calculate future subframes expected to experience coexistence issues based on previous subframes estimated to have experienced coexistence issues.

In a still further aspect, a computer program product for wireless communications in a wireless network includes a computer-readable medium having program code recorded thereon. The program code includes program code to receive signaling from a served User Equipment (UE), via a radio access technology, indicating an interfering technology associated with coexistence issues experienced by the served UE. Also included is program code to calculate future subframes expected to experience coexistence issues based on previous subframes estimated to have experienced coexistence issues.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
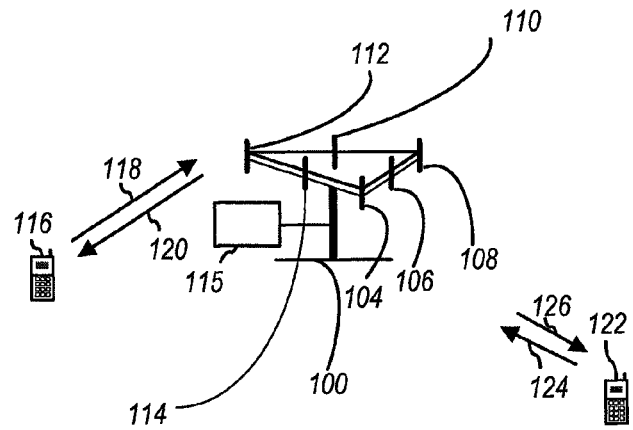
FIG. 1 illustrates a multiple access wireless communication system according to one aspect.

Various aspects of the disclosure provide techniques to mitigate coexistence issues in multi-radio devices. As explained above, some coexistence issues persist because an eNB is not aware of interference on the UE side that is experienced by other radios. According to one aspect, a UE identifies existing or potential coexistence issues and sends a message to the eNB that indicates that a coexistence issue exists. The message can include an identification of resources experiencing coexistence issues, an identification of resources that are experiencing fewer (or no) coexistence issues, an indication that some LTE events are being denied in arbitration at the UE, a modified Channel Quality Indicator (CQI), a modified Power Headroom Report (PHR), or any other helpful information. The eNB then knows that a coexistence issue exists at the UE and can select and implement mechanisms to aid the UE in mitigating the coexistence issues. Examples are described in more detail below.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). cdma2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
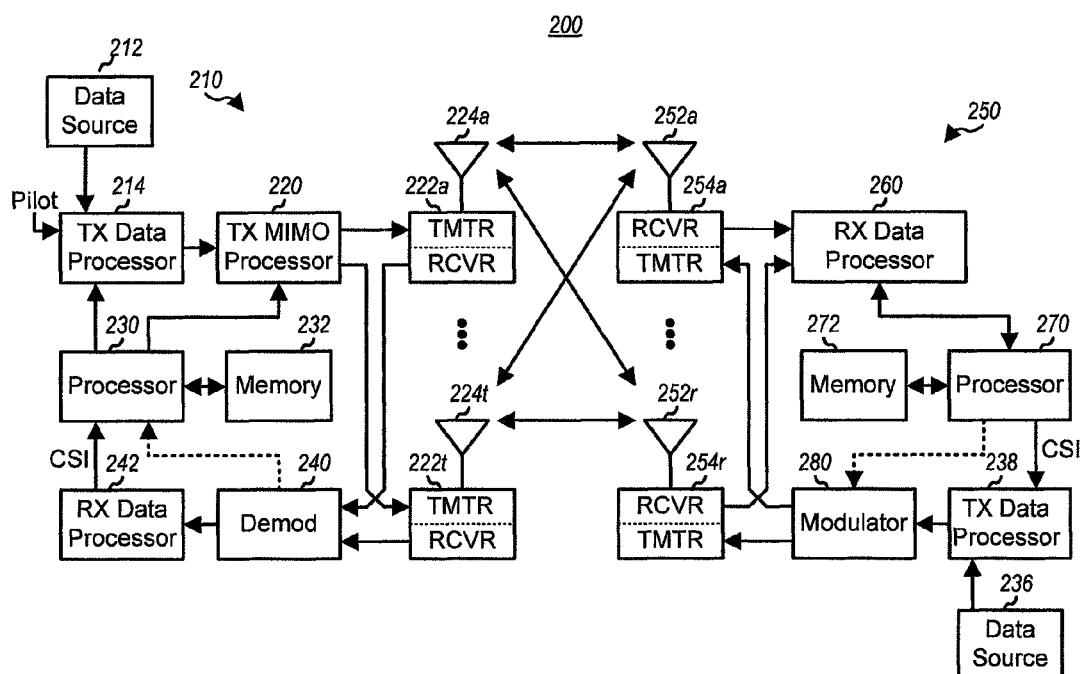
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
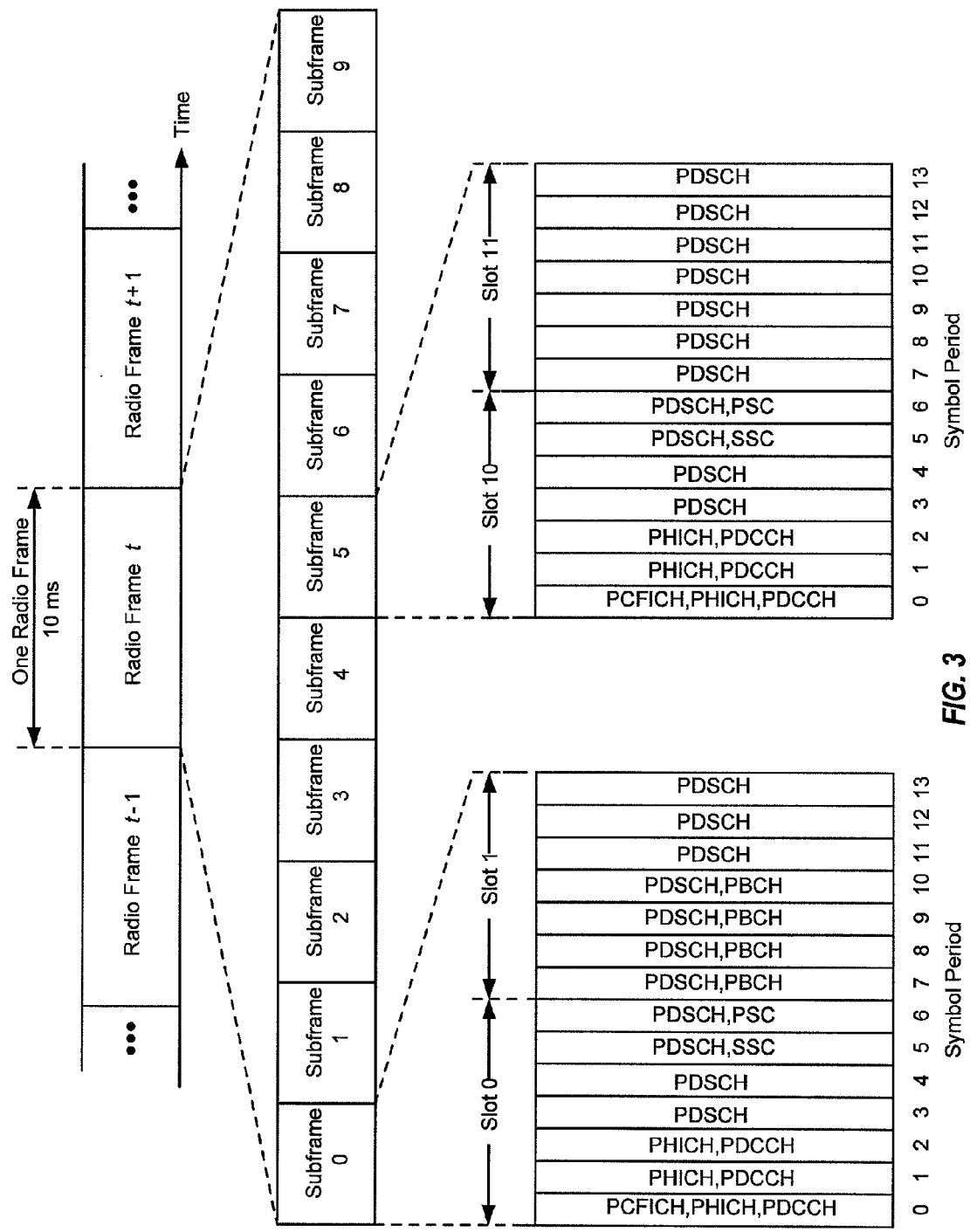
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
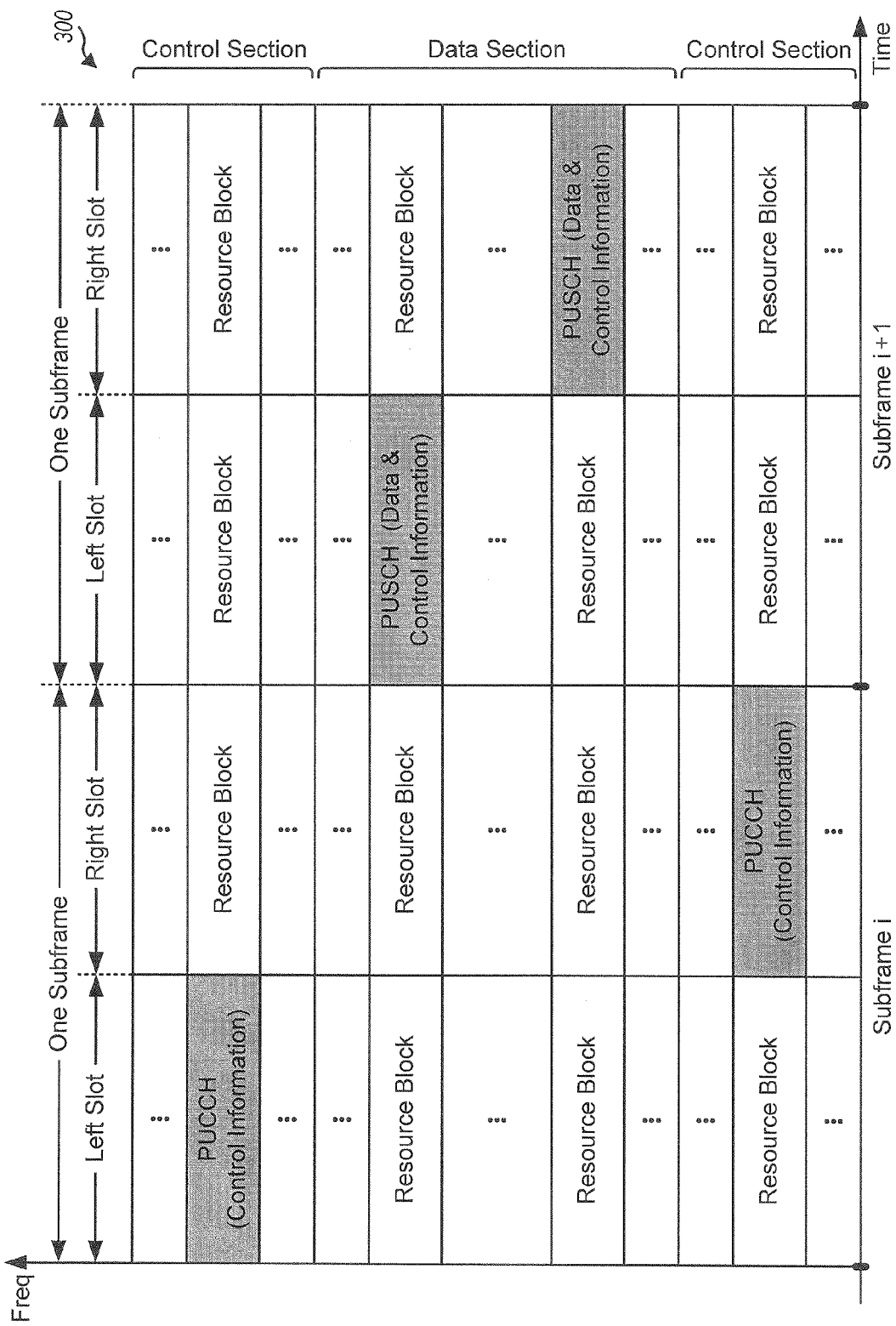
FIG. 4 is a block diagram conceptually illustrating an exemplary frame structure in uplink Long Term Evolution (LTE) communications.

FIG. 4 is a block diagram conceptually illustrating an exemplary frame structure 300 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
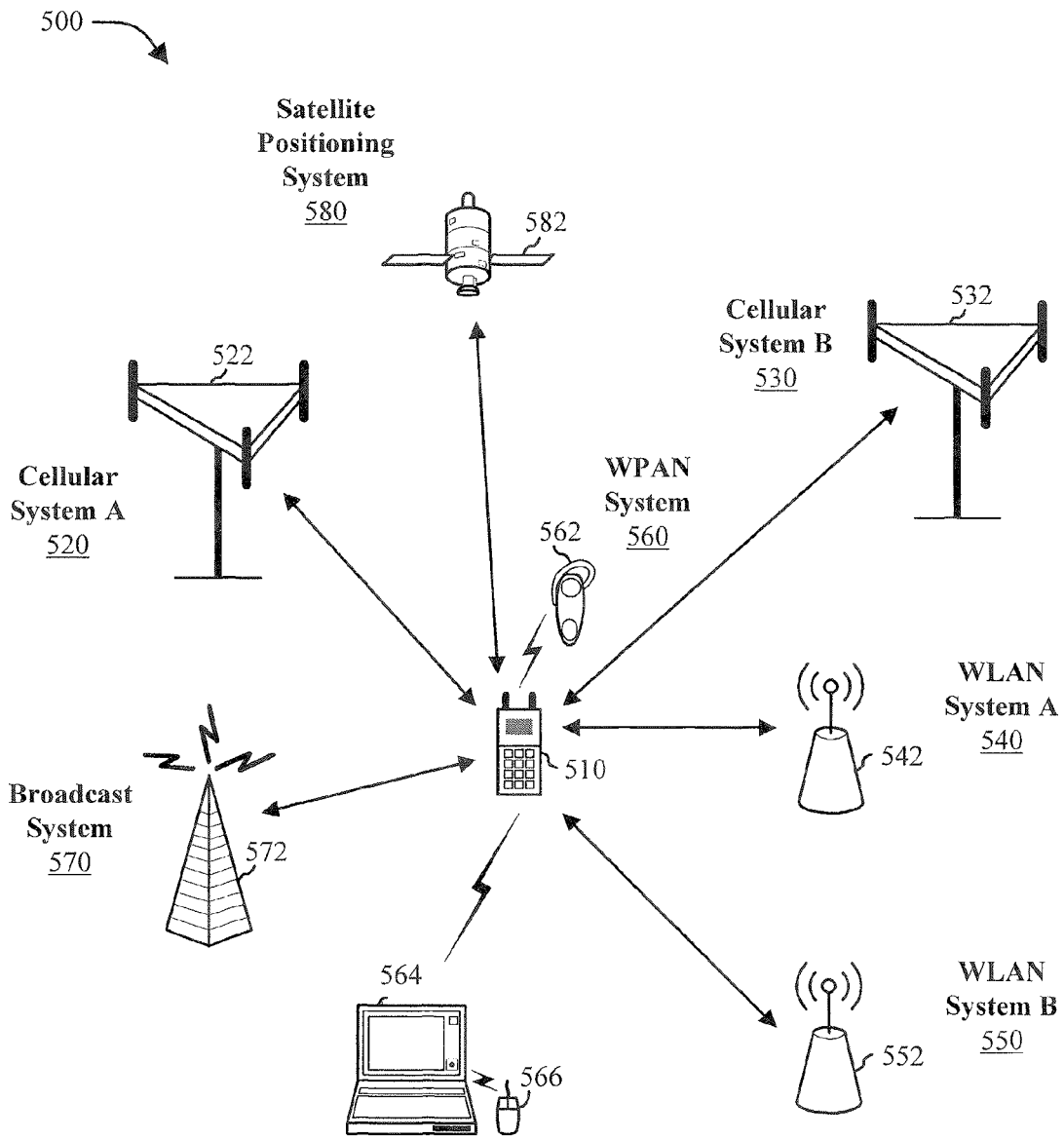
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "$3^{rd}$ Generation Partnership Project" (3GPP). cdma2000 and UMB are described in documents from an organization named "$3^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (Wi-Fi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™ Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as well as to report on coexistence issues, as explained further below.

Figure 6:
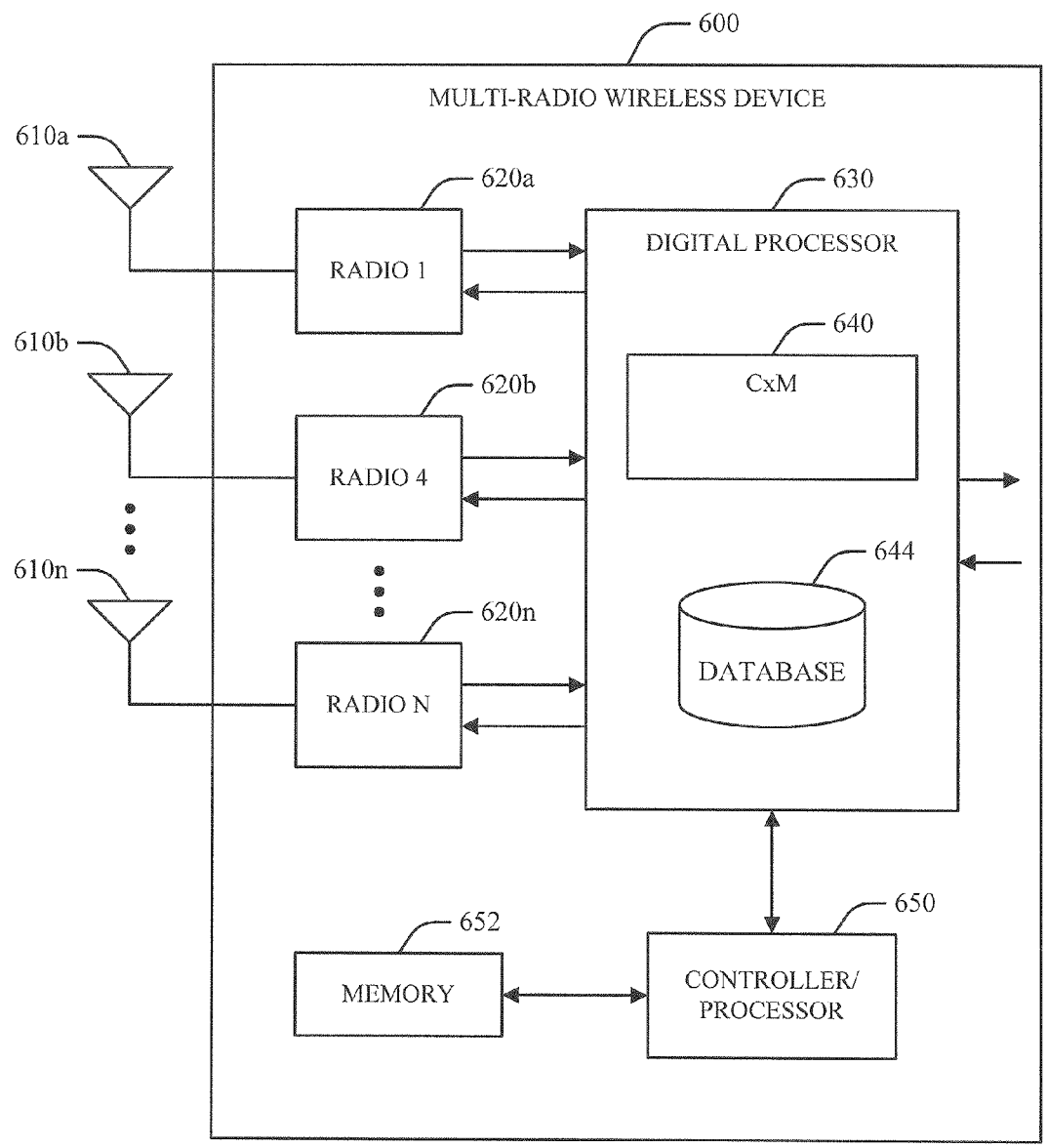
FIG. 6 is a block diagram of an example design for a multi-radio wireless device.

Turning next to FIG. 6, a block diagram is provided that illustrates an example design for a multi-radio wireless device 600 and may be used as an implementation of the wireless device 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620.

Another function of the CxM 640 is arbitration among the constituent radios 620 so that operation of one of the radios may be denied momentarily for the benefit of another radio. Under some proposed coexistence manager (CxM) architectures, some LTE uplink events may be denied in arbitration in favor of allowing an ISM radio to transmit or receive. However, denying uplink events leads to other issues, as discussed further below. Accordingly, it would be desirable to implement mechanisms to reduce the instances where LTE is denied; additionally, it would be desirable to mitigate the impact to the overall LTE system when events are denied.

As explained further below, the CxM 640 can be adapted for a variety of techniques to decrease interference between the radios. In one example, the CxM 640 reports coexistence issues to the serving eNB. In another example, the CxM 640 sends a modified CQI or a PHR to the eNB that causes the eNB to alter communication parameters with the UE in order to decrease the impact of coexistence issues.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
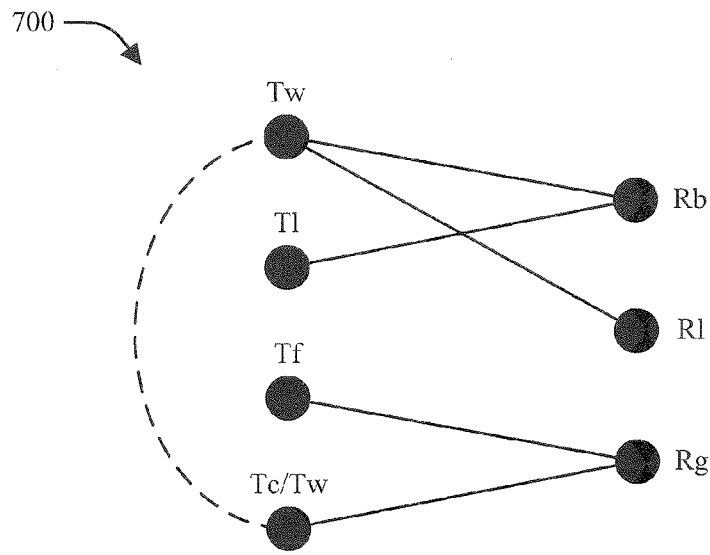
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as that illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Ft), a GSM/WCDMA transmitter (Tc/Tw), an LTE receiver (Rl). a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (T1) and the Bluetooth receiver (Rb); (3) the WLAN transmitter (Tw) and the LTE receiver (R1); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
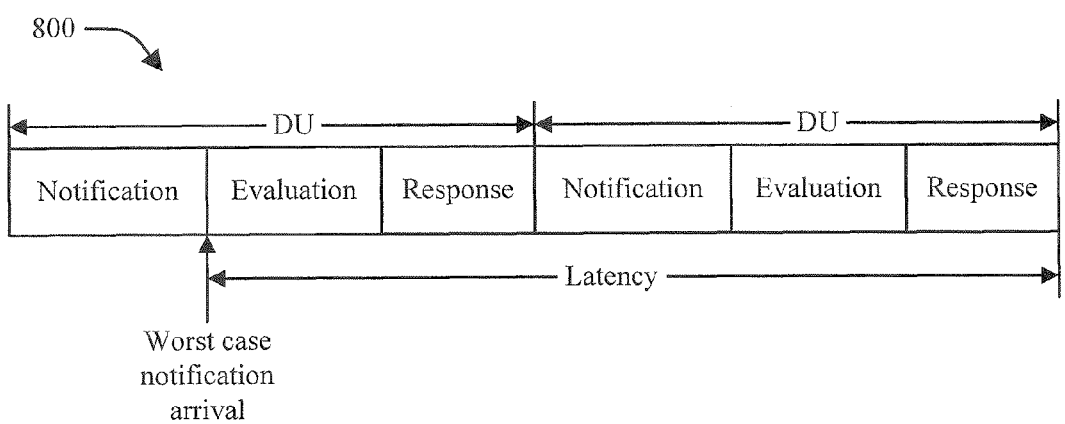
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by the UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Also, in-device coexistence problems can exist with respect to a UE between resources such as, for example, LTE and ISM bands (e.g., for Bluetooth/WLAN). Further, under some proposed CxM architectures, it can be appreciated that some events, such as LTE UL events, may be denied in arbitration. Accordingly, it would be desirable to implement mechanisms to reduce the instances where radios, such as LTE radios are denied. Additionally, it would be desirable to mitigate the impact to the overall system (e.g., the overall LTE system) when events are denied.

Figure 9:
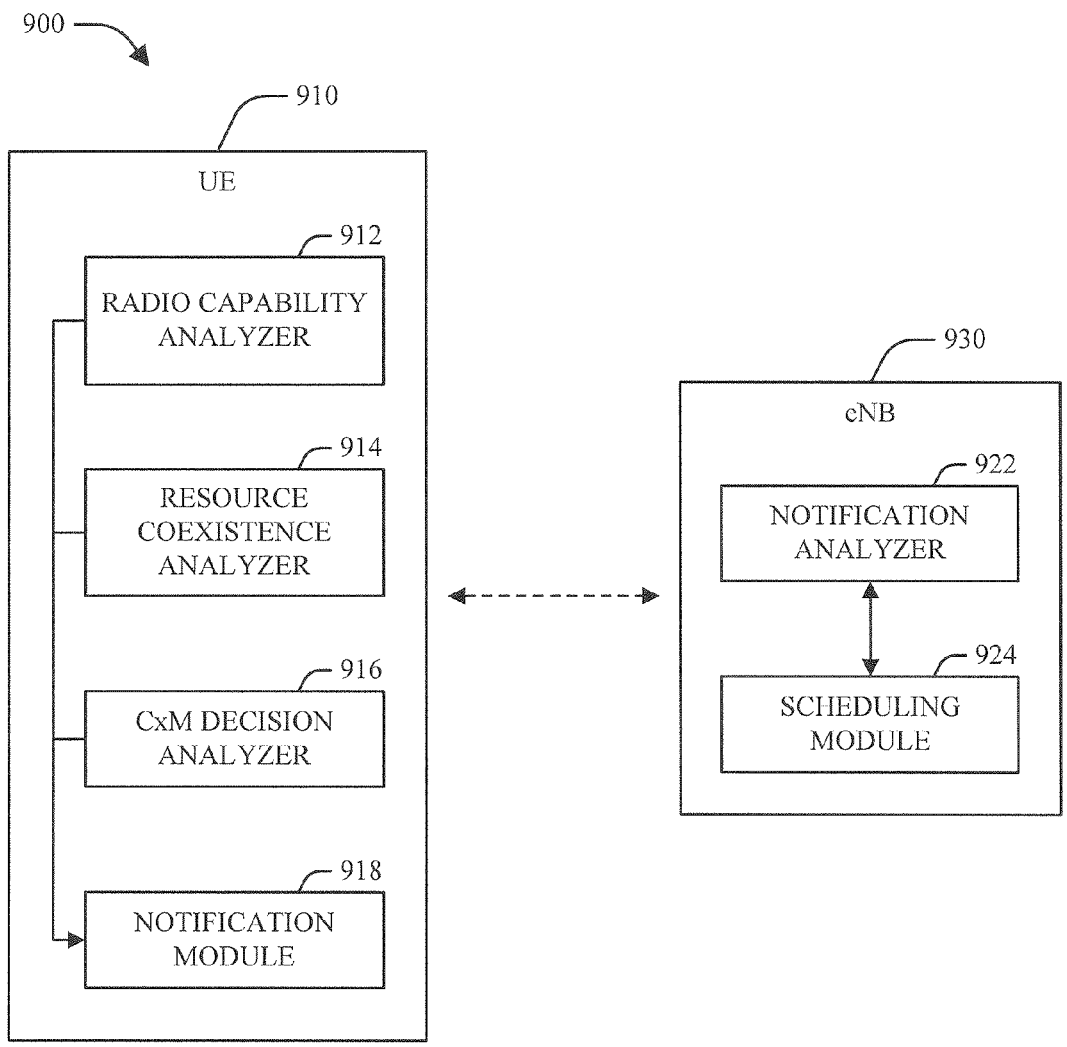
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in UL, DL, and/or any other suitable communication with each other and/or any other entities in the system 900. In one example, the UE 910 and/or eNB 930 can be operable to communicate using a variety of resources, including frequency channels, and subbands, some of which can potentially be colliding with other radio resources (e.g., a Bluetooth radio). The UE 910 and eNB 930 can utilize various techniques for managing coexistence between multiple radios of the UE 910, as generally described herein.

To mitigate at least the above shortcomings, the UE 910 and the eNB 930 can utilize respective features described herein and illustrated by the system 900 to facilitate support for multi-radio coexistence within the UE 910. The various modules 912-918 may be, in some examples, implemented as part of a coexistence manager such as the CxM 640 of FIG. 6.

In an aspect, the UE 910 can utilize a notification module 918, in cooperation with other mechanisms such as a radio capability analyzer 912 and/or the resource coexistence analyzer 914, to indicate to the eNB 930 in a message that the UE 910 is experiencing a coexistence problem with, e.g., Bluetooth or WLAN.

The resource coexistence analyzer 914 recognizes that unacceptable performance occurs or is expected to occur due to interference. In one example, the resource coexistence analyzer 914 is equipped to detect interference. Additionally or alternatively, the resource coexistence analyzer 914 may be programmed to know that when certain radios use certain channels, coexistence issues are necessarily present. Additionally or alternatively, the resource coexistence analyzer 914 may be programmed to know that certain radios operating at the same time will necessarily have coexistence issues.

The message sent from the UE 910 to the eNB 930 can be, for example, a static one-time capability indication of multi-radio use with Bluetooth/WLAN (i.e., a static indication of multi-radio capability), a dynamic message that indicates when Bluetooth/WLAN is turned ON or when it is turned OFF, or the like. In one example, the eNB 930 can utilize a notification analyzer 922, a scheduling module 924, and/or other suitable means to select and implement techniques to aid the UE 910 in mitigating the coexistence solution. These techniques can include, for example, a handover to another frequency or RAT, use of a measurement gap pattern or DRX cycle that prevents operation of the LTE radio during periods where other radios can operate, etc.

In one example scenario, the UE 910 sends a message to the eNB 930 alerting the eNB 930 to coexistence issues at the UE 910. The eNB 930 then initiates an inter-frequency or inter-RAT handover of the LTE communications. For instance, the eNB 930 may initiate a handover from one LTE channel to another LTE channel or from LTE to another RAT, such as GSM.

In a second example scenario, the UE 910 sends a message to the eNB 930 alerting the eNB 930 to coexistence issues at the UE 910. The eNB 930 then schedules a measurement gap pattern for the UE 910 that attempts to mitigate the interference issues by creating measurement gaps in the radio technology. The radio technology can be LTE or any other technology capable of providing gaps. Conventional LTE provides for measurement gaps. The gaps can be created in either an interfering radio technology or a victim radio technology. An eNB 930 may instruct a UE 910 to be silent (i.e., no uplink or downlink communications) every so many milliseconds of a cycle. Gaps currently provided include: 6 ms out of every 40 ms, and 6 ms out of every 80 ms. During the measurement gap, the UE 910 measures interfering signals in various channels. The UE 910 then reports the information to the eNB 930, and the eNB 930 uses the reported information, e.g., to handover the LTE communications of the UE 910 to another channel that should be expected to experience less interference. Measurement gap configuration is initiated by the eNB 930 in conventional LTE systems.

In some aspects, new gap patterns are defined for the measurement gaps, where such new gap patterns provide evenly-distributed gaps that can be utilized by another radio. One example pattern includes 20 ms out of 40 ms, and another example includes 30 ms out of 60 ms. In such example gap patterns, half of each cycle is a measurement gap and can be used by other radios. For instance, according to one example, 20 ms of every 40 ms period can be used by a Bluetooth radio (and/or other radios) without LTE interference.

In one embodiment, the UE can influence the type and phase of the gap pattern using the coexistence message. In one example, the eNB can use a measurement gap of 20 ms over 40 ms with the start offset of the gap indicated by the UE in the coexistence message.

In a third example scenario, the UE 910 sends a message to the eNB 930 alerting the eNB 930 to coexistence issues at the UE 910. The eNB 930 then configures a discontinuous reception (DRX) mode cycle for the UE 910 that attempts to mitigate the interference issues. The DRX cycle includes the periodic switching off of an LTE receiver on the downlink, usually for power saving purposes. In conventional LTE, an eNB 930 configures a DRX cycle for a UE 910. During the DRX cycle, the eNB 930 knows times when the UE 910 is on and listens for downlink communication and when the UE 910 is off and does not listen for downlink communications. Uplink communications may proceed, even if the downlink communications are in an off period. A DRX cycle includes 1) an on Duration, where the UE 910 is awake and listens for downlink communications, 2) a period after the on Duration to accommodate activities, such as receiving grants and resolving HARQ and retransmission, and 3) an inactive period.

Figure 12A:
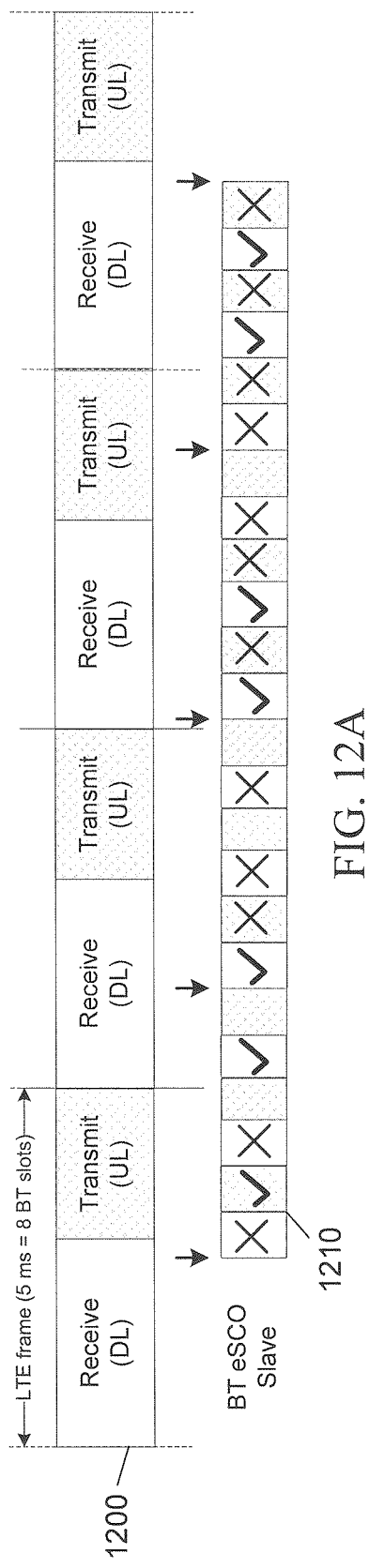
FIGS. 12A and B show exemplary timelines with respect to a short term gap.

The gap patterns can also be on a shorter time-scale to allow latency constrained voice traffic on a Bluetooth (or other) radio. For example, FIG. 12A shows a time-line 1200 for time division-long term evolution (TD-LTE) (Configuration 1) and a timeline of Bluetooth extended synchronous connections (eSCO) 1210 as a slave. The downlink time slots (i.e., receiving at the UE) are shown as solid, whereas the uplink timeslots (i.e., transmitting from the UE are shown as shaded.) Without any gaps, Bluetooth packets are lost in three out of four eSCO intervals, where each eSCO interval is 3.75 ms. In FIGS. 12A and B, the slots having "Xs" represent slots with lost packets, whereas the slots having "checkmarks" represent slots having successful transmissions. The slots without an X or checkmark in the Bluetooth timelines 1210, 1260 represent slots where no transmission occurs.

Figure 12B:
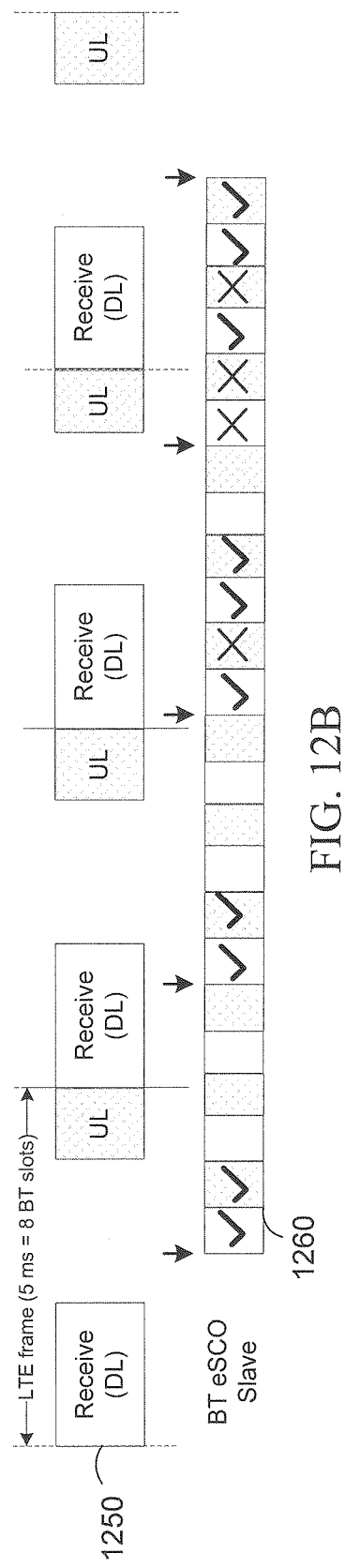

Referring now to FIG. 12B, an embodiment of the present disclosure is described in which a short term gap is created. For example, one downlink and one uplink sub-frame can be removed in the middle of each LTE frame (as seen in the timeline 1250). By creating a gap of, for example, 2 ms every 5 ms in LTE, the previously lost Bluetooth packets can be recovered, as shown in the Bluetooth timeline 1260 of FIG. 12B. More specifically, many of the slots having an "X" in the timeline 1210 are indicated as including successfully transmitted packets in the timeline 1260. The gap configuration in this example is merely exemplary and other short-term gap configurations are also contemplated.

Various aspects may configure DRX cycles differently than in conventional LTE. For instance, the shortDRXcycle parameter is set to zero so that only a long DRX cycle is used. The active time after the on Duration can be restricted to 4 ms or some other small number of milliseconds to shorten the active time after the on Duration. The drx-InactivityTimer and drx-RestransmissionTimer parameters, which configure the active time after on Duration, are set to zero (or another small number such as one) to remove the additional active time to wait for downlink grants. However, such specific values are exemplary, and other aspects may use different values.

In one implementation, the on Duration and 4 ms period following can be used by an LTE radio, while the time until the next on Duration can be used by another radio, such as a Bluetooth or WLAN radio. For instance, in one example based on these settings, LTE and Bluetooth/WLAN can utilize Time Division Multiplexing (TDM) with 34 ms for LTE and 30 ms for Bluetooth/WLAN, out of a 64 ms DRX cycle. Thus, the DRX cycle is shared in approximate halves between LTE and ISM, where the 4 ms period after on Duration is in the range of ⅟16 of the DRX cycle length.

In an aspect, if the eNB 930 sends a NACK for any of the last four uplink subframes of on Duration, the HARQ packet can be considered as terminated in error by both the eNB 930 and the UE 910. In other words, if there is an unsuccessful uplink transmission in the last four subframes of the on Duration, then a NACK is sent to the UE 910 four subframes later in the active time. In conventional LTE, the UE 910 will retransmit 4 ms after receiving the NACK; however, in some present aspects, it is desirable for the UE 910 not to transmit after the active period ends. Accordingly, the eNB 930 and the UE 910 can negotiate a timeline such that if a NACK is sent to the UE 910, the UE 910 will not retransmit. The packet is then terminated in error by both the UE 910 and the eNB 930. Thus, the UE 910 does not transmit after the end of the active period, and the eNB 930 can be made aware that the UE 910 will not retransmit and can accordingly reassign those resources. In some instances, the eNB 930 and the UE 910 may agree on a timeline in which the retransmission is sent in the next on Duration.

Thus, the eNB 930 may perform a handover, may configure a measurement gap pattern, and/or may configure a DRX cycle to mitigate the coexistence issues. However, the scope of aspects is not limited to those options, as other options for mitigating coexistence issues now known or later developed may be employed in other implementations.

In another aspect, the UE 910 can utilize a notification module 918, in cooperation with other mechanisms such as a resource coexistence analyzer 914 or the like, to indicate to the eNB 930 one or more portions of bandwidth where there is no coexistence issue. This can, for example, enable the eNB 930 to schedule the LTE radio (e.g., via the scheduling module 924) in parts of the band with fewer (or no) coexistence issues while increasing or maximizing the available resources for the UE 910.

In one embodiment, the indication is implicit. For example, a channel quality indicator (CQI) of a sub-band may be modified, leading the eNB to believe the channel quality is different (e.g., worse) that what it actually is. In another embodiment, the power of a transmitted signal, such as a sounding reference signal (SRS) could be modified. For example, if the UE reduces the transmit power of the SRS in a particular sub-band, then the eNB perceives the sub-band as a bad sub-band. The sub-band CQI report modification and SRS power modification are implicit techniques for sub-band restriction on downlink and uplink, respectively. An explicit technique would be for the UE to indicate the coexistence information of some sub-bands in a message.

In a further aspect, if the UE 910 has to continue a connection in a problematic portion of the band, the UE 910 can, via the notification module 918 and/or other suitable components, take steps to suggest to the eNB 930 to avoid allocations that would lead to higher uplink transmit power or a higher downlink SNR requirement. For instance, in uplink communications, scheduling is based on Power Headroom Reports (PHRs). The eNB 930 receives the PHR and assigns a certain rate to the uplink, which leads to a certain transmit power at the UE 910 based on the content in the PHR. However, higher power (and higher rate) on the uplink can cause more interference with the other radios in the UE 910. In some aspects, the UE 910 chooses a lower PHR than what is really seen, and the PHR causes the eNB to assign a lower rate to the uplink.

Similarly, the downlink is scheduled by Channel Quality Indicator (CQI) reports sent from the UE 910 to the eNB 930. In some aspects, the UE 910 sends a CQI report to the eNB 930 that causes the eNB 930 to assign a lower rate to the UE 910 downlink. A lower rate at the downlink may lead to higher interference tolerance with other radios at the UE 910. In one example, lower uplink and downlink power requirements can reduce the chance that, e.g., Bluetooth/WLAN and LTE will not be able to coexist at the UE 910.

In another aspect, the coexistence manager in the UE 910 forces LTE uplink communications to stop or the LTE downlink to stop receiving to allow an ISM event to go through. However, this may affect power control based on HARQ termination in conventional LTE systems at the eNB 930.

In conventional LTE, HARQ control and power loops run on an eNB 930 that keeps track of termination statistics and targets certain termination statistics. For example, some control loops may target an error rate, such as 70% proper termination at first transmission. If an LTE uplink is simply shut off, then the control loops at the eNB 930 may miss the statistics because it appears as additional errors to the control loops. This may cause improper loop behavior where thresholds are set lower and lower as the errors add up, a cycle that feeds on itself and causes inefficient operation. Similar effects may be seen in the downlink rate control loops, due to the additional errors from a coexistence algorithm.

Thus, in an aspect, the UE 910 can utilize the notification module 918 in cooperation with mechanisms such as a CxM decision analyzer 916 to provide a message to the eNB 930 indicating that, e.g., some LTE events are being denied. The eNB 930 then knows of the LTE event denial and can prevent the control loops from taking drastic steps in setting thresholds. In one embodiment, the denial of a radio event (e.g., an LTE event) includes denial of a subframe, a frame, a block, a retransmission, an ACK, etc. Different metrics for the denials may be reported by the UE in the message to the eNB. For instance, the UE may indicate to the eNB the average of the number of uplink and downlink subframes denied due to coexistence every T milliseconds such as T=100. Another example is where the UE simply reports the probability of a particular subframe being denied due to coexistence. Other examples are also contemplated, such as when the UE reports the probability of a PUCCH transmission being denied.

In one embodiment, the message includes additional factors to apply to a target termination threshold comparison when a coexistence solution is taking place at the UE 910. Such factors may include an indication of the existence of an error, an indication of expected frequency or number of denials, and/or the like. Furthermore, the message can also include an explicit indication of the subframes denied by the CxM 640 due to coexistence or some other metric that indicates how many uplink transmissions are being denied. In other embodiments, the message indicates a rate of subframe denial, a rate of frame denial, a rate of block denial, etc. Different denial rates could be reported. For example, an average for a time period, a time period average, an instantaneous time, etc. could be reported. The rate of subframe denial could be for a particular transmission. As mentioned earlier, the eNB may target an error rate at a certain HARQ transmission number. If the UE reports the rate of denial of subframes for a particular HARQ transmission number, then the eNB can prevent unnecessary adjustment of the rate control loops because the eNB becomes aware of the extent of errors due to coexistence itself in addition to the link errors. In one embodiment, the UE provides enhanced measurement reports for the condition of each frequency or RAT being reported. The enhanced measurement reports can include, for example, an interfering technology identifier and/or interfering direction information and/or the traffic pattern (e.g., mode of operation under Bluetooth).

The interfering technology indicator can identify the interfering technology on the device corresponding to the reported channel/RAT, such as Bluetooth, WLAN, GPS, etc. The interfering technology indicator can also specify the parameters associated with the traffic pattern on the interfering technology, such as voice, data, Bluetooth eSCO, etc. The eNB may use such information to configure measurement gaps on the uplink, downlink or both.

The interfering direction information can include one bit to identify whether the uplink of the reported channel/RAT is causing an in-device coexistence problem. Another bit can identify whether the downlink of the reported channel/RAT is experiencing degradation due to in-device coexistence. It may be possible that both bits are set to indicate coexistence issues on both LTE uplink and downlink. The direction information identifies whether LTE is the aggressor, the victim or both with respect to the in-device interference. The interfering direction information can be used along the with interfering technology identifier in the measurement gap configuration at the eNB so the eNB can choose the appropriate gap pattern to support coexistence.

In case the UE does not notify the eNB of the LTE events being denied, in one embodiment, the eNB estimates on its own the events being denied. Such estimation can occur when the UE informs the eNB of the interfering technology, e.g., Bluetooth, and a configuration of the interfering technology, e.g., an eSCO interval. The eNB then estimates which LTE events have been denied. For example, uplink denials can be estimated based on measured pilot energy of received communications, and downlink denials can be estimated when no ACK/NACK is received for an associated subframe. As noted above, although subframes are discussed, he present disclosure covers other units such as frames, blocks, etc.

Because both the radio access technologies (e.g., Bluetooth and LTE) are periodic, the denial pattern will be periodic. For example with Bluetooth and LTE, the pattern will repeat every 15 ms because Bluetooth eSCO intervals are 3.75 ms and LTE half frames are 5 ms. Due to the periodicity of the denial pattern, the eNB can estimate future events that will be denied. Once the eNB becomes aware of which subframes were denied due to coexistence issues, the eNB can take it into account in future scheduling. For instance, the extent of denials can be taken into account when adjusting the rate control loops. In another instance, the eNB may avoid scheduling the UE on future subframes estimated to be denied, possibly reducing or even eliminating throughput loss.

Figure 10:
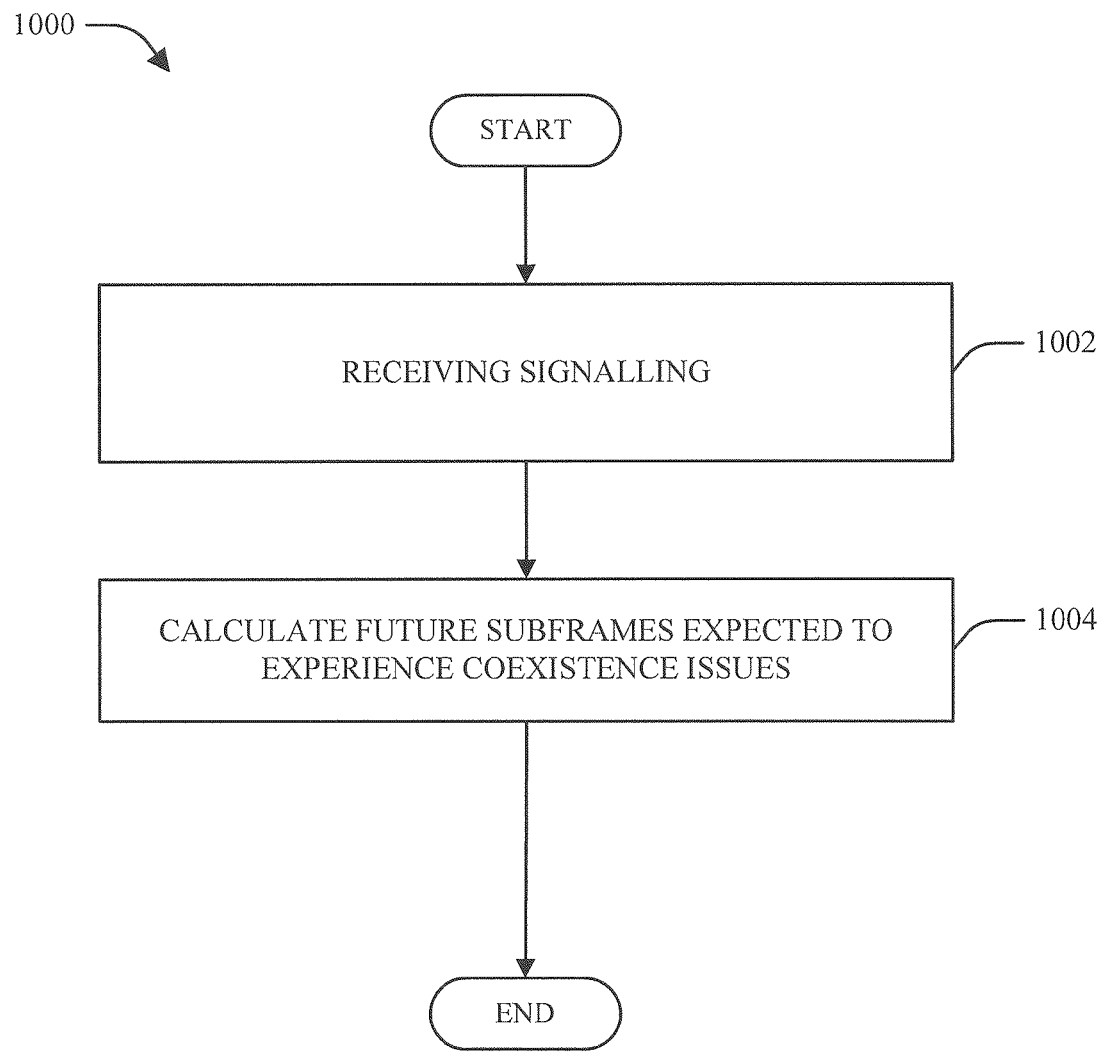
FIG. 10 illustrates a methodology that facilitates implementation of multi-radio coexistence functionality within a wireless communication system.

FIG. 10 illustrates a methodology 1000 that facilitates implementation of multi-radio coexistence functionality within a wireless communication system. The methodology 1000 may be performed, e.g., by a UE communicating with a base station, such as an eNB. At block 1002, signaling is received from a served User Equipment (UE), via a radio access technology. The signaling indicates an interfering technology associated with coexistence issues experienced by the served UE. For example, the indicator may indicate Bluetooth eSCO communications are occurring with the UE. At block 1004, future subframes are calculated. The future subframes are expected to experience coexistence issues based on previous subframes estimated to have experienced coexistence issues.

Figure 11:
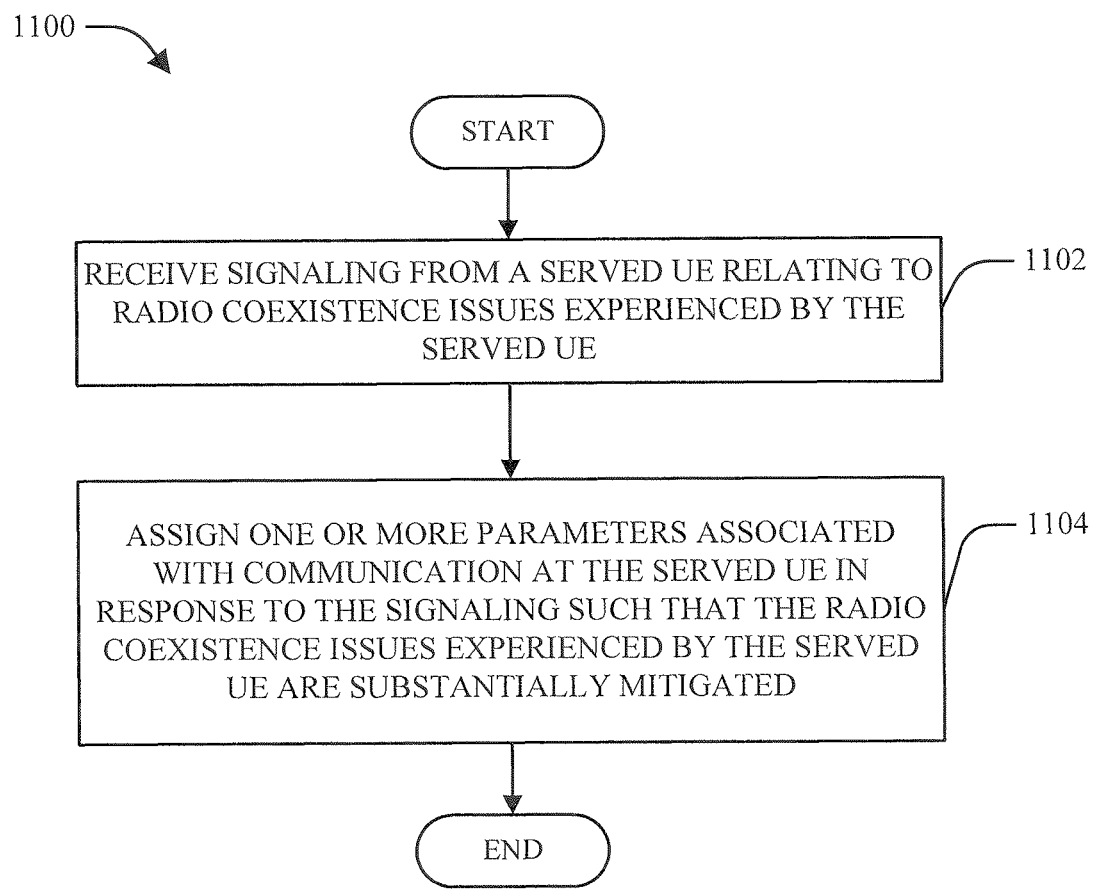
FIG. 11 illustrates a methodology that facilitates implementation of multi-radio coexistence functionality within a wireless communication system.

FIG. 11 illustrates a methodology 1100 that facilitates implementation of multi-radio coexistence functionality within a wireless communication system. The methodology 1000 may be performed, e.g., by an eNB or other base station communicating with a UE. At block 1102, signaling relating to radio coexistence issues experienced by a served UE is received from the served UE via a first radio technology. At block 1104, one or more parameters associated with communication at the served UE are assigned such that the radio coexistence issues experienced by the served UE are completely or substantially mitigated. In one example, the base station performs a handover. In another example, the base station configures a measurement gap pattern or a DRX cycle to provide a TDM solution with LTE and the other resource. The base station may have multiple options to choose from and may select one or more of the options based on any criteria.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
receiving signaling from a served User Equipment (UE), via a first radio access technology (RAT), indicating an interfering technology of a second RAT used by the served UE and associated with in-device coexistence issues with the first RAT experienced by the served UE, the signaling from the served UE not indicating which events of the first RAT were denied by the served UE due to the coexistence issues;
in response to receiving the signaling from the served UE, estimating which of the events of the first RAT have been denied by the served UE due to the coexistence issues, the estimated events having been those denied by the served UE in arbitration between a first RAT radio and a second RAT radio of the served UE, the arbitration having allowed the second RAT radio to transmit or receive on the second RAT while forcing the first RAT radio to stop transmitting an uplink communications subframe or receiving a downlink communications subframe of the first RAT; and
calculating future subframes of the first RAT expected to experience the in-device coexistence issues with the interfering technology of the second RAT at the served UE based on a periodicity of the previous subframes of the first RAT estimated to have been denied by the served UE.

2. The method of claim 1, in which the estimating of which events of the first RAT have been denied comprises measuring energy of uplink communications on the first RAT received from the served UE to estimate which previous subframes of the first RAT experienced the coexistence issues with the interfering technology of the second RAT.

3. The method of claim 1, in which the estimating of which events of the first RAT have been denied comprises estimating which previous subframes of the first RAT experienced the coexistence issues based on when no acknowledgment or a negative acknowledgment was received from the served UE for previous subframes of the first RAT that had been sent to the served UE in downlink communications.

4. The method of claim 1, in which the signaling indicating the interfering technology indicates a Bluetooth configuration.

5. The method of claim 1, further comprising scheduling the served UE around the calculated future subframes, to mitigate the coexistence issues experienced by the served UE.

6. A system operable in a wireless communication system, the system comprising:
means for receiving signaling from a served User Equipment (UE), via a first radio access technology (RAT), indicating an interfering technology of a second RAT used by the served UE and associated with in-device coexistence issues between the first RAT and a second RAT experienced by the served UE;
means for estimating which events of the first RAT have been denied by the served UE due to the coexistence issues in response to the means for receiving signaling receiving signaling from the served UE, the signaling indicating the interfering technology of the second RAT but not indicating which events of the first RAT were denied due to the coexistence issues, the estimated events having been those denied by the served UE in arbitration between a first RAT radio and a second RAT radio of the served UE, the arbitration having allowed the second RAT radio to transmit or receive on the second RAT while forcing the first RAT radio to stop transmitting an uplink communications subframe or receiving a downlink communications subframe of the first RAT; and
means for calculating future subframes of the first RAT expected to experience the in-device coexistence issues with the interfering technology of the second RAT at the served UE based on a periodicity of the previous subframes of the first RAT estimated by means for estimating to have been denied by the served UE.

7. The system of claim 6 in which the means for estimating estimates which events of the first RAT have been denied based on energy of uplink communications on the first RAT received from the served UE, using the energy to estimate which previous subframes of the first RAT experienced the coexistence issues with the interfering technology of the second RAT.

8. The system of claim 6, in which the estimating estimates which events of the first RAT have been denied of the first RAT experienced the coexistence issues based on when no acknowledgment or a negative acknowledgment was received from the served UE for previous subframes of the first RAT that had been sent to the served UE in downlink communications.

9. The system of claim 6, in which the signaling to be received by the means for receiving signaling indicates that the interfering technology of the second RAT is a Bluetooth configuration, and the means for calculating calculates the future subframes of the first RAT expected to experience the coexistence issues with the Bluetooth configuration at the served UE.

10. The system of claim 6, further comprising means for scheduling the served UE, around the calculated future subframes, to mitigate the coexistence issues experienced by the served UE.

11. An apparatus for wireless communication, comprising:
a memory; and
at least one processor coupled to the memory, the at least one processor being configured:
to receive signaling from a served User Equipment (UE), via a first radio access technology (RAT), indicating an interfering technology of a second RAT used by the served UE and associated with in-device coexistence issues between the first RAT and the second RAT experienced by the served UE;
to estimate which events of the first RAT have been denied by the served UE due to the coexistence issues in response to receiving the signaling, from the served UE via the first RAT, the signaling indicating the interfering technology of the second RAT but not indicating which events of the first RAT were denied due to the coexistence issues, the estimated events having been those denied by the served UE in arbitration between a first RAT radio and a second RAT radio of the served UE, the arbitration having allowed the second RAT radio to transmit or receive on the second RAT while forcing the first RAT radio to stop transmitting an uplink communications subframe or receiving a downlink communications subframe of the first RAT; and
to calculate future subframes of the first RAT expected to experience the in-device coexistence issues with the interfering technology of the second RAT at the served UE based on a periodicity of the previous subframes of the first RAT estimated to have been denied by the served UE.

12. The apparatus of claim 11, in which the processor is further configured to estimate which events of the first RAT have been denied by measuring energy of uplink communications on the first RAT received from the served UE to estimate which previous subframes of the first RAT experienced the coexistence issues with the interfering technology of the second RAT.

13. The apparatus of claim 11, in which the processor is further configured to estimate which events of the first RAT have been denied by estimating which previous subframes of the first RAT experienced the coexistence issues based on when no acknowledgment or a negative acknowledgment was received from the served UE for previous subframes of the first RAT that had been sent to the served UE in downlink communications.

14. The apparatus of claim 11, in which the received signaling indicates that the interfering technology is a Bluetooth configuration, and the processor is configured to calculate the future subframes of the first RAT expected to experience the coexistence issues with the Bluetooth configuration at the served UE.

15. The apparatus of claim 11, in which the processor is further configured to schedule the served UE, around the calculated future subframes, to mitigate the coexistence issues experienced by the served UE.

16. A computer program product for wireless communications in a wireless network, comprising:
  a non-transitory computer-readable medium having program code recorded thereon, the program code comprising:
    program code to receive signaling from a served User Equipment (UE), via a first radio access technology (RAT), indicating an interfering technology of a second RAT used by the served UE and associated with in-device coexistence issues with the first RAT experienced by the served UE;
    program code to estimate which events of the first RAT have been denied by the served UE due to the coexistence issues in response to receiving the signaling, from the served UE via the first RAT, the signaling indicating the interfering technology of the second RAT but not indicating which events of the first RAT were denied due to the coexistence issues, the estimated events having been those denied by the served UE in arbitration between a first RAT radio and a second RAT radio of the served UE, the arbitration having allowed the second RAT radio to transmit or receive on the second RAT while forcing the first RAT radio to stop transmitting an uplink communications subframe or receiving a downlink communications subframe of the first RAT; and
    program code to calculate future subframes of the first RAT expected to the experience in-device coexistence issues with the interfering technology of the second RAT at the served UE based on a periodicity of the previous subframes of the first RAT estimated to have been denied by the served UE.

* * * * *